(12) United States Patent
Brackens

(10) Patent No.: US 10,576,870 B1
(45) Date of Patent: Mar. 3, 2020

(54) TRUCK BED CARGO ORGANIZER

(71) Applicant: Ken Brackens, Hayward, CA (US)

(72) Inventor: Ken Brackens, Hayward, CA (US)

( * ) Notice: Subject to any disclaimer, the term of this patent is extended or adjusted under 35 U.S.C. 154(b) by 0 days.

(21) Appl. No.: 16/127,307

(22) Filed: Sep. 11, 2018

(51) Int. Cl.
| | |
|---|---|
| *B60P 7/14* | (2006.01) |
| *B60P 7/08* | (2006.01) |
| *B62D 33/02* | (2006.01) |
| *B60P 1/00* | (2006.01) |
| *B62D 33/04* | (2006.01) |

(52) U.S. Cl.
CPC ............... *B60P 7/14* (2013.01); *B60P 7/0892* (2013.01); *B60P 1/003* (2013.01); *B60P 7/0823* (2013.01); *B62D 33/02* (2013.01); *B62D 33/042* (2013.01)

(58) Field of Classification Search
CPC ........... B60P 7/14; B60P 7/0892; B60P 1/003; B62D 33/042; B62D 33/046; B62D 33/02
USPC ............... 296/37.6, 37.8, 37.16, 24.4, 24.44; 224/42.34, 539
See application file for complete search history.

(56) References Cited

U.S. PATENT DOCUMENTS

| | | | | |
|---|---|---|---|---|
| 4,917,429 A | | 4/1990 | Giger | |
| 5,215,205 A | * | 6/1993 | Behlman | B60R 7/02 220/4.31 |
| 5,366,124 A | * | 11/1994 | Dearborn, IV | B60P 7/08 224/404 |
| 5,526,972 A | | 6/1996 | Frazier | |
| 5,597,193 A | | 1/1997 | Conner | |
| 5,772,058 A | * | 6/1998 | Staesche | B60R 7/02 220/520 |
| D397,322 S | | 8/1998 | Tobin | |
| 5,829,655 A | * | 11/1998 | Salopek | B60R 7/02 224/402 |
| 5,845,953 A | * | 12/1998 | Rusnock | B60P 7/0892 296/37.6 |
| 6,296,289 B1 | | 10/2001 | Gehring | |
| D450,291 S | | 11/2001 | Wang | |
| 6,435,586 B2 | * | 8/2002 | Getzschman | B60R 9/00 224/404 |
| 6,454,148 B1 | * | 9/2002 | Cook | B60R 7/02 224/403 |
| 6,676,182 B2 | * | 1/2004 | Fitts | B60P 3/40 224/403 |
| 6,779,956 B2 | * | 8/2004 | Strumolo | B60P 7/0892 410/121 |
| 6,938,807 B2 | * | 9/2005 | Victor | B60R 7/02 211/12 |

(Continued)

FOREIGN PATENT DOCUMENTS

CA        2170482        9/1996

*Primary Examiner* — Gregory A Blankenship

(57) ABSTRACT

The truck bed cargo organizer comprises a plurality of vertical wall panels that are hingedly coupled to each other to form a first compartment and a second compartment. The first compartment and the second compartment may share all or part of a common center wall panel. The front wall panel may be divided into a left front wall panel and a right front wall panel, each of which may pivot to open the front wall panel for easier access. A latch may prevent the front wall panel from opening when carrying cargo. One or more hinges at each joint between wall panels may allow the truck bed cargo organizer to fold flat for storage. A pair of straps may prevent the truck bed cargo organizer from sliding in the truck bed. Removable dividers may allow the compartments to be divided into subcompartments.

17 Claims, 4 Drawing Sheets

(56) References Cited

U.S. PATENT DOCUMENTS

| | | | |
|---|---|---|---|
| 7,104,582 B2 | 9/2006 | Morrison | |
| 8,075,037 B2 * | 12/2011 | Mahaffy | B60R 9/00 296/24.4 |
| 8,317,442 B2 | 11/2012 | Daikuzono | |
| 8,757,694 B1 * | 6/2014 | Kuhnle | B62D 33/033 296/26.08 |
| 8,794,492 B2 * | 8/2014 | Ballou | B60R 7/02 224/42.34 |
| 8,894,123 B1 * | 11/2014 | Ori | B60P 7/15 296/26.11 |
| 2003/0000982 A1 * | 1/2003 | Gehring | B60R 7/02 224/539 |
| 2007/0205243 A1 * | 9/2007 | Potts | B60R 7/02 224/539 |
| 2010/0270821 A1 * | 10/2010 | Ulita | B60R 5/04 296/37.14 |
| 2015/0307016 A1 * | 10/2015 | Payne | B60P 7/14 410/129 |

* cited by examiner

TRUCK BED CARGO ORGANIZER

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cargo organizers, more specifically, a truck bed cargo organizer.

SUMMARY OF INVENTION

The truck bed cargo organizer comprises a plurality of vertical wall panels that are hingedly coupled to each other to form a first compartment and a second compartment. The first compartment and the second compartment may share all or part of a common center wall panel. The front wall panel may be divided into a left front wall panel and a right front wall panel, each of which may pivot to open the front wall panel for easier access. A latch may prevent the front wall panel from opening when carrying cargo. One or more hinges at each joint between wall panels may allow the truck bed cargo organizer to fold flat for storage. A pair of straps may prevent the truck bed cargo organizer from sliding in the truck bed. Removable dividers may allow the compartments to be divided into subcompartments.

An object of the invention is to provide a cargo organizer for the cargo area of a vehicle.

Another object of the invention is to provide removable dividers to divider the compartments into subcompartments.

A further object of the invention is to provide hinged joints between wall panels to allow the invention to fold flat for storage, Yet another object of the invention is to provide a pair of straps to prevent the invention from sliding in the truck bed.

These together with additional objects, features and advantages of the truck bed cargo organizer will be readily apparent to those of ordinary skill in the art upon reading the following detailed description of the presently preferred, but nonetheless illustrative, embodiments when taken in conjunction with the accompanying drawings.

In this respect, before explaining the current embodiments of the truck bed cargo organizer in detail, it is to be understood that the truck bed cargo organizer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the truck bed cargo organizer.

It is therefore important that the claims be regarded as including such equivalent construction insofar as they do not depart from the spirit and scope of the truck bed cargo organizer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
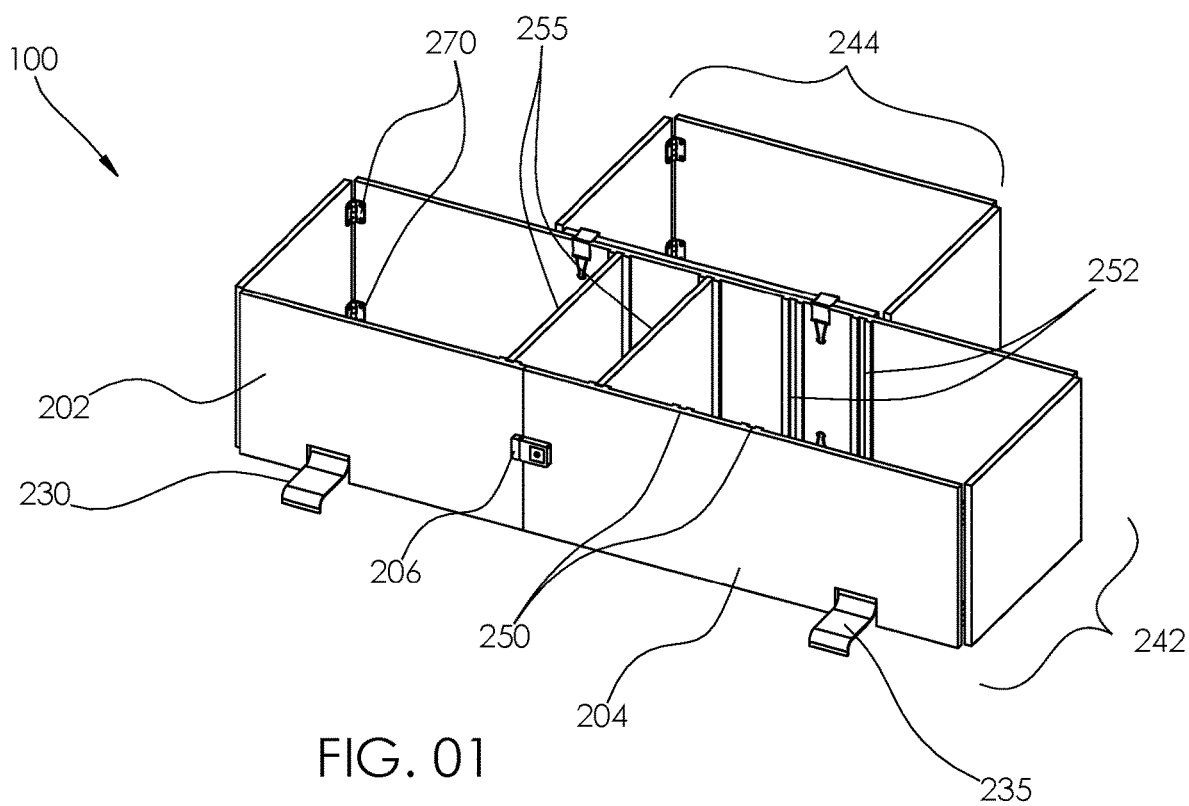
FIG. 1 is a perspective view of an embodiment of the disclosure.
Figure 2:
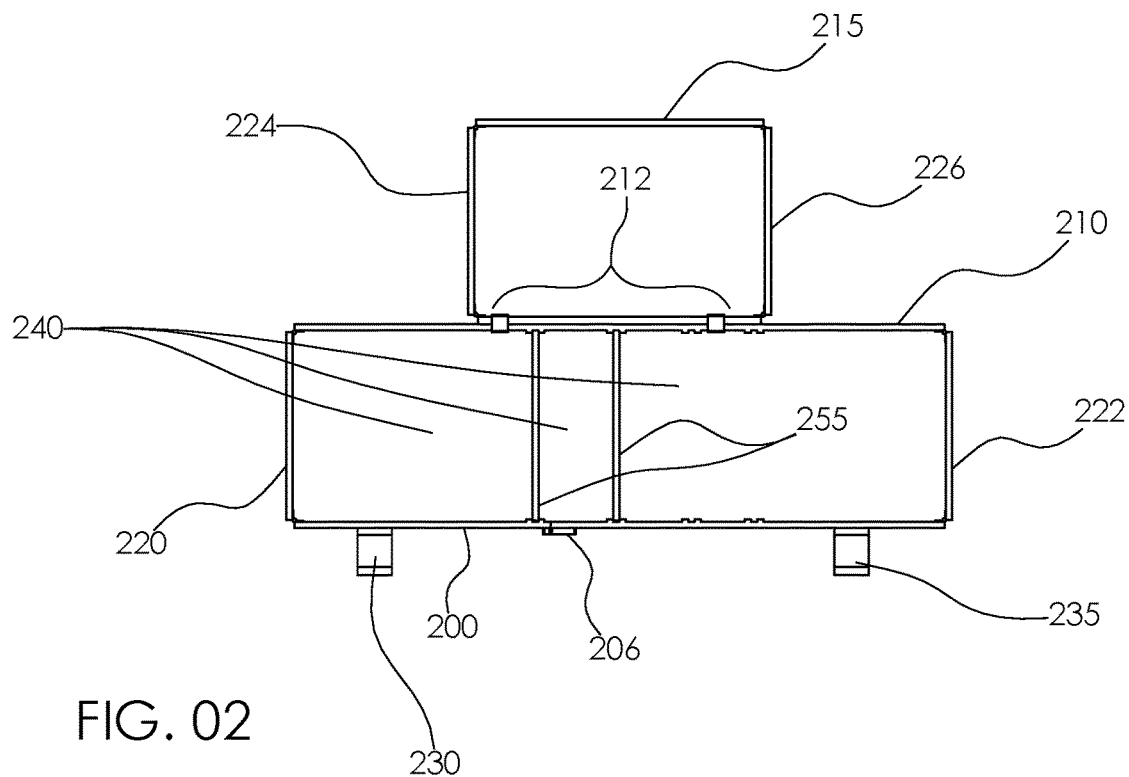
FIG. 2 is a top view of an embodiment of the disclosure illustrating the front all panel in the closed position.
Figure 3:
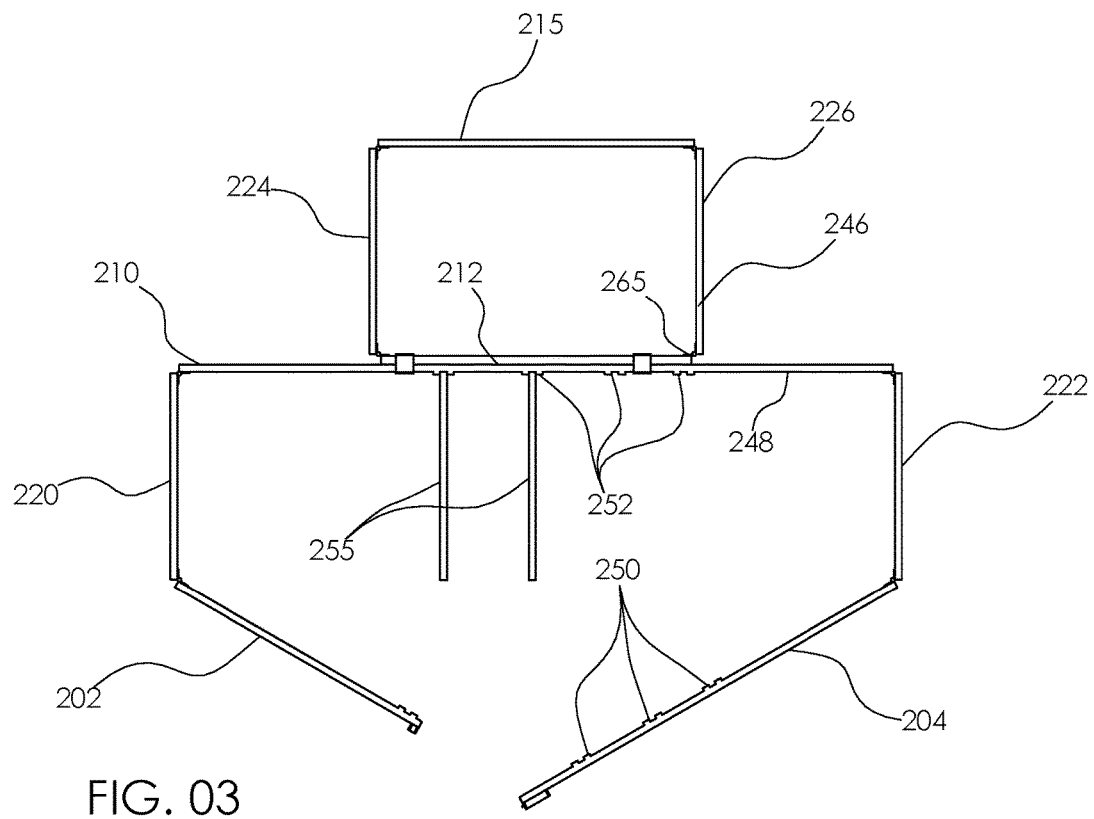
FIG. 3 is a top view of an embodiment of the disclosure front all panel in the open position.
Figure 4:
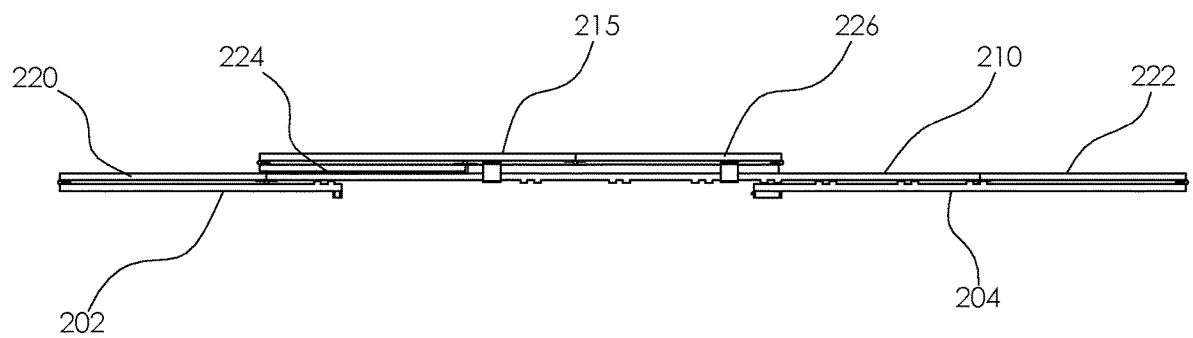
FIG. 4 is a top view of an embodiment of the disclosure illustrating the invention folded for storage.
Figure 5:
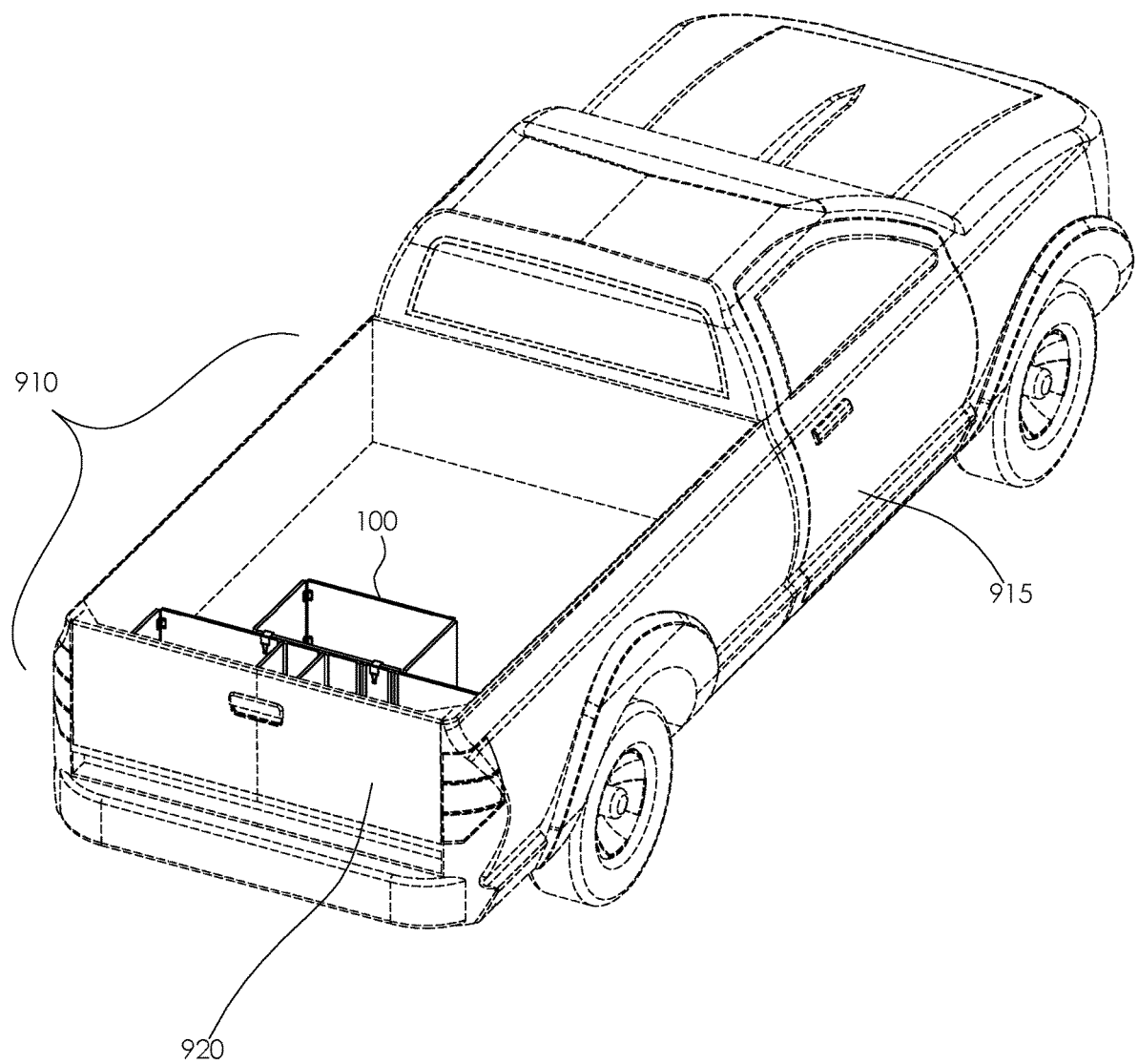
FIG. 5 is an in-use view of an embodiment of the disclosure.
Figure 6:
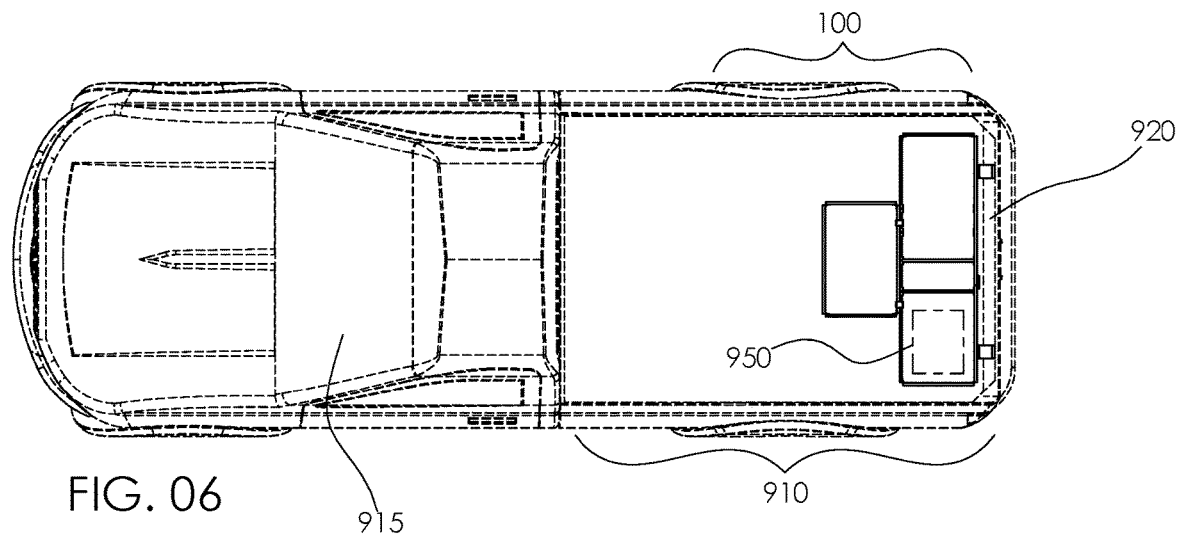
FIG. 6 is a top in-use view of an embodiment of the disclosure illustrating the invention while transporting cargo.
Figure 7:
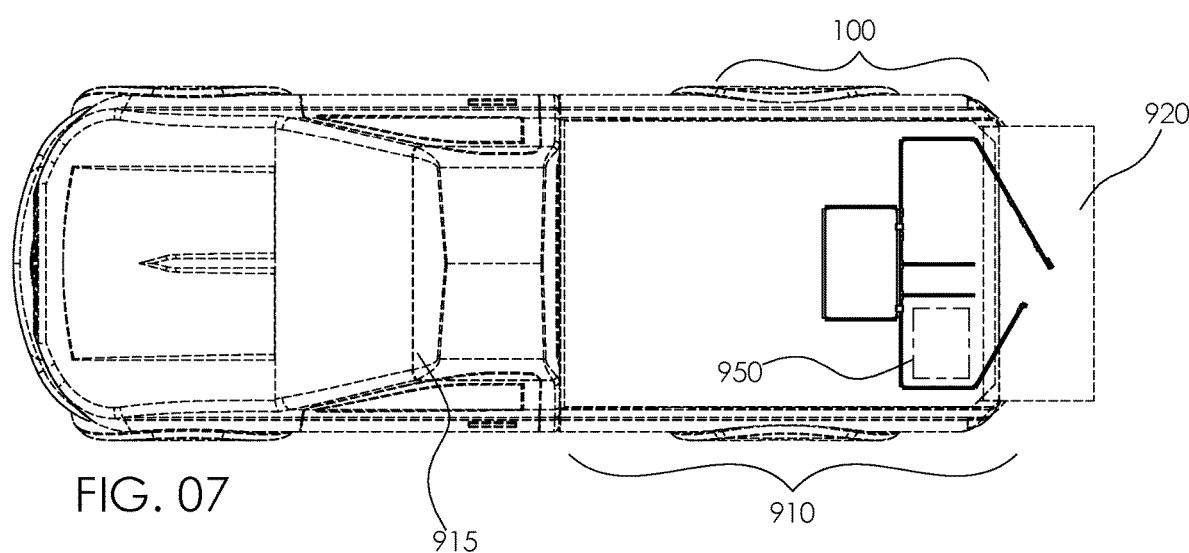
FIG. 7 is a top in-use view of an embodiment of the disclosure illustrating the front wall panels hinged open for access to the cargo.
Figure 8:
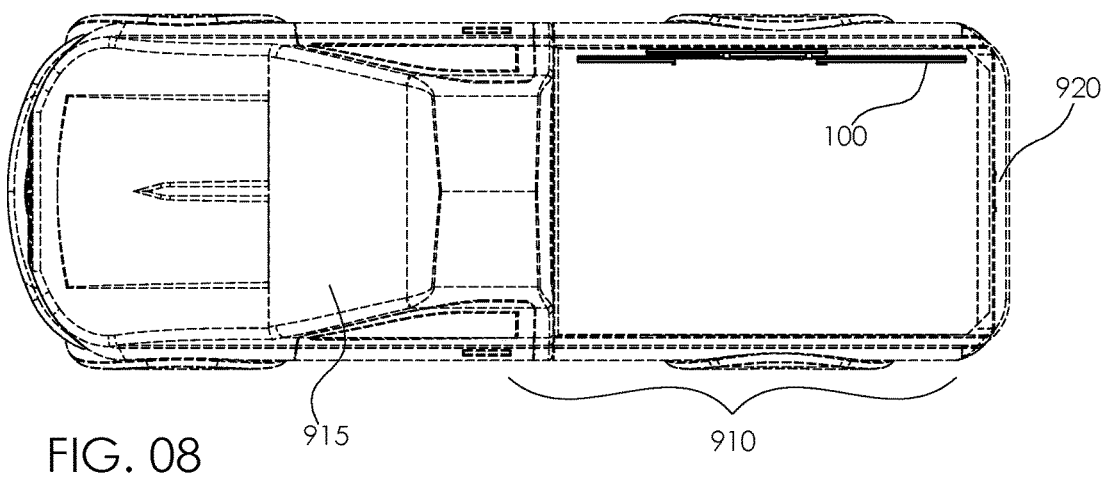
FIG. 8 is a top in-use view of an embodiment of the disclosure illustrating the invention folded and stowed.

Detailed reference will now be made to a first potential embodiment of the disclosure, which is illustrated in FIGS. 1 through 8.

The truck bed cargo organizer 100 (hereinafter invention) comprises a front wall panel 200, a center wall panel 210, a rear wall panel 215, a left front side wall panel 220, a right front side wall panel 222, a left rear side wall panel 224, and a right rear side wall panel 226. The invention 100 is an organizer for a cargo area of a vehicle. As non-limiting examples, the invention 100 may be used to organize a bed 910 of a truck 915 or a trunk of a car.

Throughout this disclosure, "front" and "rear" are directional reference terms that are to be interpreted from the viewpoint of a user standing at the rear of the vehicle and looking at the invention 100. Specifically, front refers to the side closest to that user and rear refers to the side of the invention 100 that is farthest from that user. Note that this is opposite the references used when referring to the vehicle itself. Left will be to that user's left and right will be to that user's right.

The front wall panel 200, the left front side wall panel 220, the center wall panel 210, and the left rear side wall panel 224 comprise a first compartment 242. The first compartment 242 may be a rectangular storage area with an open top and an open bottom.

The center wall panel 210, the left rear side wall panel 224, the rear wall panel 215, and the right rear side wall panel 226 comprise a second compartment 244. The second compartment 244 may be a rectangular storage area with an open top and an open bottom. The second compartment 244 may be adjacent to the first compartment 242, sharing the center wall panel 210.

The lateral width of the first compartment 242 may be the same as the lateral width of the front wall panel 200. The lateral width of the center wall panel 210 may be the same as lateral width of the front wall panel 200.

The center wall panel 210 may comprise a shared wall portion 212. The shared wall portion 212 may be a portion of the center wall panel 210 that is shared by both the first compartment 242 and the second compartment 244. The lateral width of the shared wall portion 212 may be less than or equal to the lateral width of the center wall panel 210.

The lateral width of the second compartment 244 may be the same as the lateral width of the shared wall portion 212. The lateral width of the rear wall panel 215 may be the same as the lateral width of the shared wall portion 212.

The left edge of the front wall panel 200 may be coupled to the front edge of the left front side wall panel 220. The right edge of the front wall panel 200 may be coupled to the front edge of the right front side wall panel 222. The left edge of the center wall panel 210 may be coupled to the rear edge of the left front side wall panel 220. The right edge of the center wall panel 210 may be coupled to the rear edge of the right front side wall panel 222.

The left edge of the shared wall portion 212 may be coupled to the front edge of the left rear side wall panel 224. The right edge of the shared wall portion 212 may be coupled to the front edge of the right rear side wall panel 226. The left edge of the rear wall panel 215 may be coupled to the rear edge of the left rear side wall panel 224. The right edge of the rear wall panel 215 may be coupled to the rear edge of the right rear side wall panel 226.

At each location where side walls meet to form a corner 265 of the first compartment 242 or the second compartment 244, the side walls may be pivotably coupled to each other using one or more hinges 270 located on the interior of the corner 265. An individual hinge selected from the one or more hinges 270 may pivot through a 180-degree opening angle. The 180 degree opening angle may allow a first side wall 246 to be oriented at a right angle relative to a second side wall 248, forming an angle of 90 degrees between the first side wall 246 and the second side wall 248. The 180 degree opening angle may allow the first side wall 246 to be pivoted to a position that is parallel to the second side wall 248 on one side of the perpendicular position, forming an angle of 0 degrees between the first side wall 246 and the second side wall 248. The 180 degree opening angle may allow the first side wall 246 to be pivoted to a position that is parallel to the second side wall 248 on the opposite one side of the perpendicular position, forming an angle of 180 degrees between the first side wall 246 and the second side wall 248.

The invention 100 may fold flat by pivoting all of the one or more hinges 270 so that each of the side walls move to either the 0 degree position or to the 180 degree position relative to another of the side walls. (See FIG. 4.) While folded flat, the invention 100 may be transported or stored.

As a non-limiting example, the invention 100 may be folded flat and secured to a side of the bed 910 of the truck 915 when not in use.

The front wall panel 200 may comprise a left front wall panel 202, a right front wall panel 204, and a latch 206. The left front wall panel 202 and the right front wall panel 204 may butt against each other at a midpoint of the front wall panel 200 and may couple to each other via the latch 206 to form a one contiguous panel that prevents cargo 950 from falling out of the front of the invention 100. The left front wall panel 202 may be separated from the right front wall panel 204 by releasing the latch 206. The left front wall panel 202 may pivot open at the one or more hinges 270 that join the left front wall panel 202 to the left front side wall panel 220 by moving the right side of the left front wall panel 202 forward and to the left. The right front wall panel 204 may pivot open at the one or more hinges 270 that join the right front wall panel 204 to the right front side wall panel 222 by moving the left side of the right front wall panel 204 pivoted forward and to the right. The cargo 950 may be loaded or unloaded through the front of the invention 100 when the left front wall panel 202, the right front wall panel 204, or both are pivoted open.

The invention 100 may further comprise one or more front divider guides 250, one or more rear divider guides 252, and one or more divider walls 255. An individual divider wall selected from the one or more divider walls 255 may be lowered into place between one of the one or more rear divider guides 252 and a corresponding one of the one or more front divider guides 250 to create a plurality of subcompartments 240. The one or more front divider guides 250 and the one or more rear divider guides 252 may be vertically oriented slots located on the interior sides of the front wall panel 200, the center wall panel 210, the shared wall portion 212, the rear wall panel 215, or combinations thereof. An individual front divider guide selected from the one or more front divider guides 250 and an individual rear divider guide selected from the one or more rear divider guides 252 may be paired so that the individual front divider guide and the individual rear divider guide are located the same lateral distance from one of the side walls.

The invention 100 may further comprise a left strap 230 and a right strap 235. The left strap 230 and the right strap 235 may prevent the invention 100 from sliding within the bed 910 of the truck 915. One end of the left strap 230 may be coupled to the bottom of the front wall panel 200. The other end of the left strap 230 may be placed between the rear edge of the bed 910 and a tailgate 920 while the tailgate 920 is lowered, such that when the tailgate 920 is raised the left strap 230 is retained between the bed 910 and the tailgate 920. One end of the right strap 235 may be coupled to the bottom of the front wall panel 200. The other end of the right strap 235 may be placed between the rear edge of the bed 910 and the tailgate 920 while the tailgate 920 is lowered, such that when the tailgate 920 is raised the right strap 235 is retained between the bed 910 and the tailgate 920.

In use, the invention 100 is placed in the cargo area of the vehicle. As a non-limiting example, the invention 100 may be placed in the bed 910 of the truck 915. The invention 100 is unfolded by pivoting all of the one or more hinges 270 such that the side walls are perpendicular to each other wherever they meet. The tailgate 920 may be lowered to allow the left strap 230 and the right strap 235 to be hung between the bed 910 and the tailgate 920 when the tailgate 920 is closed. The one or more divider walls 255 may be lowered into position between the one or more front divider guides 250 and the one or more rear divider guides 252 to create the plurality of subcompartments 240 if desired. The cargo 950 may be placed into the first compartment 242, into the second compartment 244, into the plurality of subcompartments 240, or into combinations thereof. While the vehicle is in motion, the invention 100 may prevent the cargo 950 from rolling around in the cargo area. The cargo 950 may be removed from the invention 100 through the open top of the first compartment 242, the second compartment 244, and/or the plurality of subcompartments 240. The front wall panel 200 may be opened by releasing the latch 206 and pivoting the left front wall panel 202 and/or the right front wall panel 204 to provide access to the front of the invention 100 for loading or unloading.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, "cargo" refers to one or more objects that are intended to be transported using a vehicle. As used in this disclosure, the word "correspond" indicates that a first object is in some manner linked to a second object in a one to one relationship or that one or more properties shared by two or more objects match, agree, or align within acceptable manufacturing tolerances.

As used herein, the words "couple", "couples", "coupled" or "coupling", refer to connecting, either directly or indirectly, and does not necessarily imply a mechanical connection.

As used herein, the word "desired" refers to a specific value within a range of supported values. A "desired" value indicates that a range of values is enabled by the invention and that a user of the invention may select a specific value within the supported range of values based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, a "hinge" is a device that permits the turning, rotating, or pivoting of a first object relative to a second object.

As used in this disclosure, the word "interior" is used as a relational term that implies that an object is located or contained within the boundary of a structure or a space.

As used in this disclosure, a "latch" is a fastening or locking mechanism. The use of the term latch may imply the insertion of an object into a notch or cavity. The act of latching may involve a linear, pivoting, or rotating motion.

As used in this disclosure, the word "lateral" refers to the sides of an object or movement towards a side. Lateral directions are generally perpendicular to longitudinal directions. "Laterally" refers to movement in a lateral direction.

As used here, the word "midpoint" refers to a point near the center of an object. An "exact midpoint" refers to a midpoint that is equidistant from edges of the object in at least one direction. Unless otherwise stated, a midpoint is not required to be at the exact center of the object but instead may be within 50% of the distance from the exact midpoint to the farthest edge.

As used herein, "opening angle" refers to the angular range of motion of a hinge as measured from one extreme to the opposite extreme. As a non-limiting example, a hinge having a 180 degree opening angle may pivot through an angle of 180 degrees from its extreme closed position to its extreme open position.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure a "strap" is a strip of leather, cloth, nylon, plastic, thin metal, rubber, or other flexible material, that is used to fasten, secure, carry, or hold onto something. A strap is sometimes used in conjunction with a buckle.

As used in this disclosure, a "tailgate" is a hinged door mounted on the rear of a pickup truck that can be pivoted open and, in some embodiments, removed in order to facilitate loading of the pickup truck.

As used in this disclosure, a "vehicle" is a device that is used for transporting passengers, goods, or equipment.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A truck bed cargo organizer comprising:
   a front wall panel, a center wall panel, a rear wall panel, a left front side wall panel, a right front side wall panel, a left rear side wall panel, and a right rear side wall panel;
   wherein the truck bed cargo organizer is an organizer for a cargo area of a vehicle;
   wherein the front wall panel, the left front side wall panel, the center wall panel, and the right front side wall panel comprise a first compartment;
   wherein the first compartment is a rectangular storage area with an open top and an open bottom;
   wherein an individual hinge selected from a one or more hinges pivots through a 180 degree opening angle;
   wherein the 180 degree opening angle allows a first side wall to be oriented at a right angle relative to a second side wall, forming an angle of 90 degrees between the first side wall and the second side wall;
   wherein the 180 degree opening angle allows the first side wall to be pivoted to a position that is parallel to the second side wall on one side of the perpendicular position, forming an angle of 0 degrees between the first side wall and the second side wall;

wherein the 180 degree opening angle allows the first side wall to be pivoted to a position that is parallel to the second side wall on the opposite one side of the perpendicular position, forming an angle of 180 degrees between the first side wall and the second side wall.

2. The truck bed cargo organizer according to claim 1 wherein the center wall panel, the left rear side wall panel, the rear wall panel, and the right rear side wall panel comprise a second compartment;
wherein the second compartment is a rectangular storage area with an open top and an open bottom;
wherein the second compartment is adjacent to the first compartment and shares the center wall panel.

3. The truck bed cargo organizer according to claim 2 wherein the lateral width of the first compartment is the same as the lateral width of the front wall panel;
wherein the lateral width of the center wall panel is the same as the lateral width of the front wall panel.

4. The truck bed cargo organizer according to claim 3 wherein the center wall panel comprises a shared wall portion;
wherein the shared wall portion is a portion of the center wall panel that is shared by both the first compartment and the second compartment;
wherein the lateral width of the shared wall portion is less than or equal to the lateral width of the center wall panel.

5. The truck bed cargo organizer according to claim 4 wherein the lateral width of the second compartment is the same as the lateral width of the shared wall portion;
wherein the lateral width of the rear wall panel is the same as the lateral width of the shared wall portion.

6. The truck bed cargo organizer according to claim 5 wherein the left edge of the front wall panel is coupled to the front edge of the left front side wall panel;
wherein the right edge of the front wall panel is coupled to the front edge of the right front side wall panel;
wherein the left edge of the center wall panel is coupled to the rear edge of the left front side wall panel;
wherein the right edge of the center wall panel is coupled to the rear edge of the right front side wall panel.

7. The truck bed cargo organizer according to claim 6 wherein the left edge of the shared wall portion is coupled to the front edge of the left rear side wall panel;
wherein the right edge of the shared wall portion is coupled to the front edge of the right rear side wall panel;
wherein the left edge of the rear wall panel is coupled to the rear edge of the left rear side wall panel;
wherein the right edge of the rear wall panel is coupled to the rear edge of the right rear side wall panel.

8. The truck bed cargo organizer according to claim 7 wherein side walls are pivotably coupled to each other using one or more hinges located on the interior of a corner at each location where the side walls meet to form the corner of the first compartment or the second compartment.

9. The truck bed cargo organizer according to claim 8 wherein the truck bed cargo organizer folds flat by pivoting all of the one or more hinges so that each of the side walls move to either the 0 degree position or to the 180 degree position relative to another of the side walls;
wherein the truck bed cargo organizer is transported or stored while folded flat.

10. The truck bed cargo organizer according to claim 9 wherein the front wall panel comprises a left front wall panel, a right front wall panel, and a latch;
wherein the left front wall panel and the right front wall panel butt against each other at a midpoint of the front wall panel and couple to each other via the latch to form a one contiguous panel that prevents cargo from falling out of the front of the truck bed cargo organizer.

11. The truck bed cargo organizer according to claim 10 wherein the left front wall panel is separated from the right front wall panel by releasing the latch.

12. The truck bed cargo organizer according to claim 11 wherein the left front wall panel pivots open at the one or more hinges that join the left front wall panel to the left front side wall panel by moving the right side of the left front wall panel forward and to the left;
wherein the right front wall panel pivots open at the one or more hinges that join the right front wall panel to the right front side wall panel by moving the left side of the right front wall panel pivoted forward and to the right.

13. The truck bed cargo organizer according to claim 12 wherein the cargo is loaded or unloaded through the front of the truck bed cargo organizer when the left front wall panel, the right front wall panel, or both are pivoted open.

14. The truck bed cargo organizer according to claim 13 wherein the truck bed cargo organizer comprises one or more front divider guides, one or more rear divider guides, and one or more divider walls;
wherein an individual divider wall selected from the one or more divider walls is lowered into place between one of the one or more rear divider guides and a corresponding one of the one or more front divider guides to create a plurality of subcompartments.

15. The truck bed cargo organizer according to claim 14 wherein the one or more front divider guides and the one or more rear divider guides are vertically oriented slots located on the interior sides of the front wall panel, the center wall panel, the shared wall portion, the rear wall panel, or combinations thereof.

16. The truck bed cargo organizer according to claim 15 wherein an individual front divider guide selected from the one or more front divider guides and an individual rear divider guide selected from the one or more rear divider guides are paired so that the individual front divider guide and the individual rear divider guide are located the same lateral distance from one of the side walls.

17. The truck bed cargo organizer according to claim 16 wherein the truck bed cargo organizer comprises a left strap and a right strap;
wherein the left strap and the right strap prevent the truck bed cargo organizer from sliding within a bed of a truck;
wherein one end of the left strap is coupled to the bottom of the front wall panel;
wherein the other end of the left strap is placed between the rear edge of the bed and a tailgate while the tailgate is lowered, such that when the tailgate is raised the left strap is retained between the bed and the tailgate;
wherein one end of the right strap is coupled to the bottom of the front wall panel;
wherein the other end of the right strap is placed between the rear edge of the bed and the tailgate while the tailgate is lowered, such that when the tailgate is raised the right strap is retained between the bed and the tailgate.

\* \* \* \* \*